(12) United States Patent  (10) Patent No.: US 7,991,279 B2
Chiang  (45) Date of Patent: Aug. 2, 2011

(54) IMAGE STABILIZATION SYSTEM

(75) Inventor: Shun-Fan Chiang, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 0 days.

(21) Appl. No.: 12/770,755

(22) Filed: Apr. 30, 2010

(65) Prior Publication Data

US 2011/0158616 A1 Jun. 30, 2011

(30) Foreign Application Priority Data

Dec. 30, 2009 (TW) .................................. 98145861

(51) Int. Cl.
G03B 17/00 (2006.01)

(52) U.S. Cl. ........................................................ 396/55
(58) Field of Classification Search ...................... 396/55
See application file for complete search history.

(56) References Cited

U.S. PATENT DOCUMENTS

| 5,905,917 | A * | 5/1999 | Imura | 396/55 |
| 7,714,893 | B2 * | 5/2010 | Makii | 348/208.99 |
| 2008/0187301 | A1 * | 8/2008 | Takahashi | 396/55 |
| 2010/0067889 | A1 * | 3/2010 | Suzuki | 396/55 |

* cited by examiner

Primary Examiner — Clayton E Laballe
Assistant Examiner — Dennis Hancock
(74) Attorney, Agent, or Firm — Raymond J. Chew

(57) ABSTRACT

An exemplary image stabilization system includes a fixed body having a first receiving cavity therein, a movable unit received in the first receiving cavity, a pivot member located between the fixed body and the movable unit, a motion sensor, a driving module, and a U-shaped magnetic shield. The pivot member is engagingly received in and between the fixed body and the movable unit. The motion sensor is disposed on the fixed body for detecting a movement of the image stabilization system. The driving module is configured for driving the movable unit to rotate around the pivot member to compensate a movement of the image stabilization system based on the motion detection result of the motion sensor. The U-shaped magnetic shield includes a first plate, a second plate, and a connecting plate between the first and second plates. The first vertical is securely mounted on the movable unit. The second plate is located on an opposite side of the first plate to the fixed barrel. The driving module is arranged between the first plate and the second plate.

20 Claims, 5 Drawing Sheets

IMAGE STABILIZATION SYSTEM

BACKGROUND

1. Technical Field

The present disclosure relates to camera systems, and particularly to an image stabilization system.

2. Description of Related Art

In normal use of a camera, light rays from an object transmit into the camera and fall on a particular region of an image sensor. The image sensor forms an optical image associated with the object at a first position.

However, camera-shake due to hand-held shooting during optical image capture can result in the camera moving slightly relative to the object. Consequently, light rays from the object may fall on a different region of the image sensor causing the optical image associated with the object at a second position to form a blurry optical image. Current image stabilization systems that deal with this problem are expensive and complicated.

Therefore, a new image stabilization system is desired to overcome the above-mentioned problems.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

Figure 1:
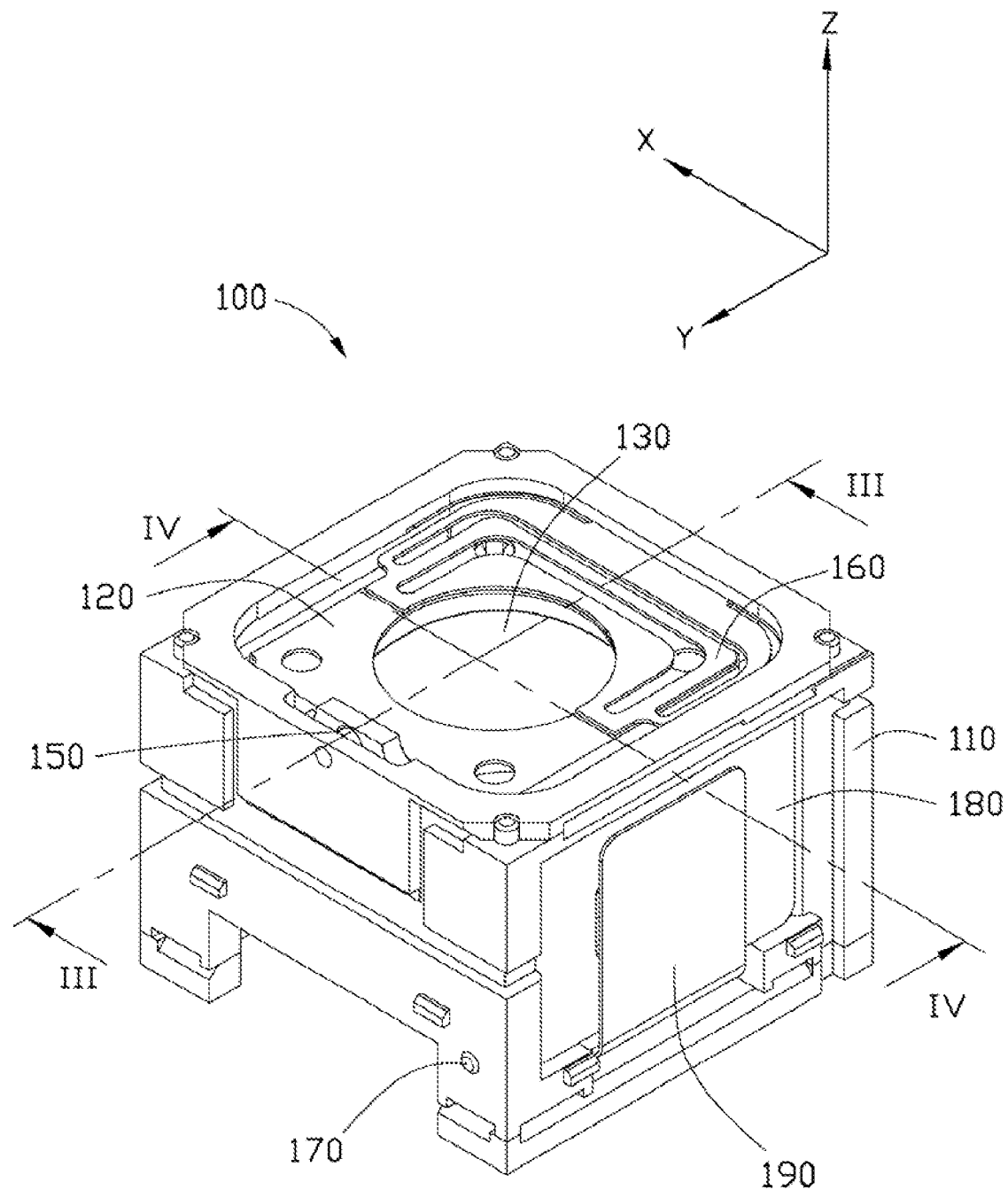
FIG. 1 is an isometric view of an image stabilization system according to a first embodiment.
Figure 2:
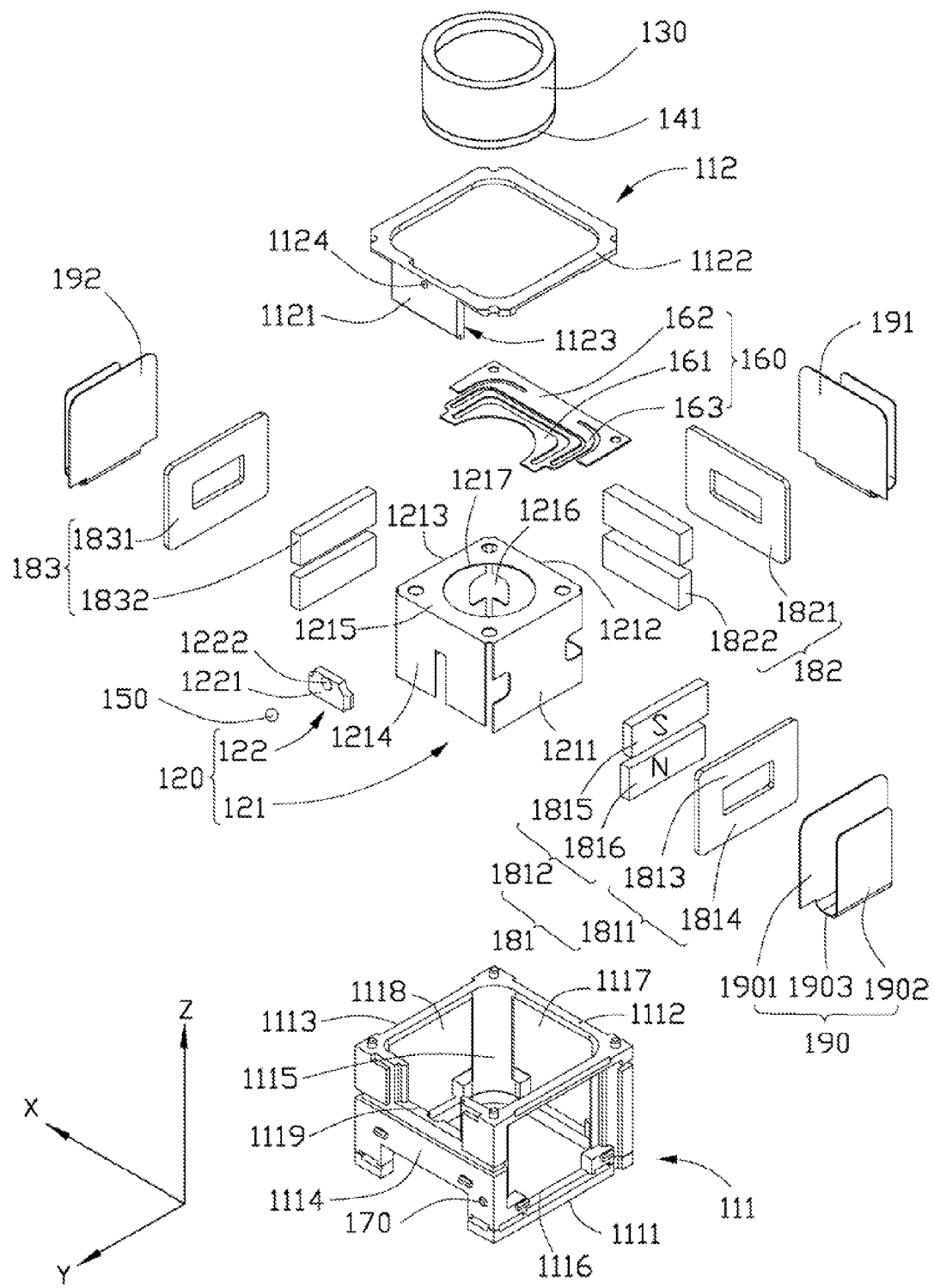
FIG. 2 is an exploded, isometric view of the stabilizing camera system of FIG. 1.
Figure 3:
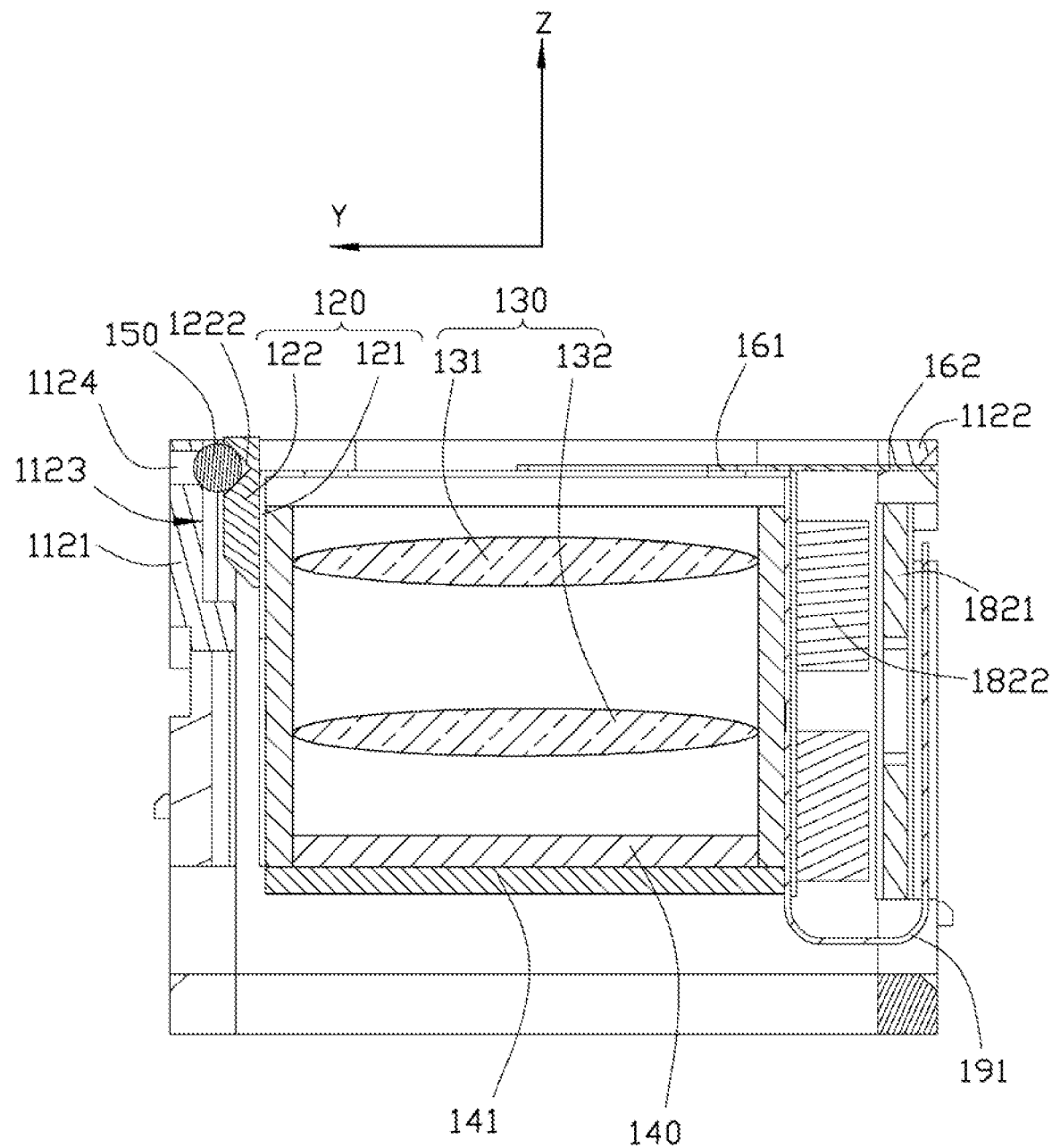
FIG. 3 is a cross-sectional view of the stabilization system of FIG. 1, taken along a line III-III thereof.
Figure 4:
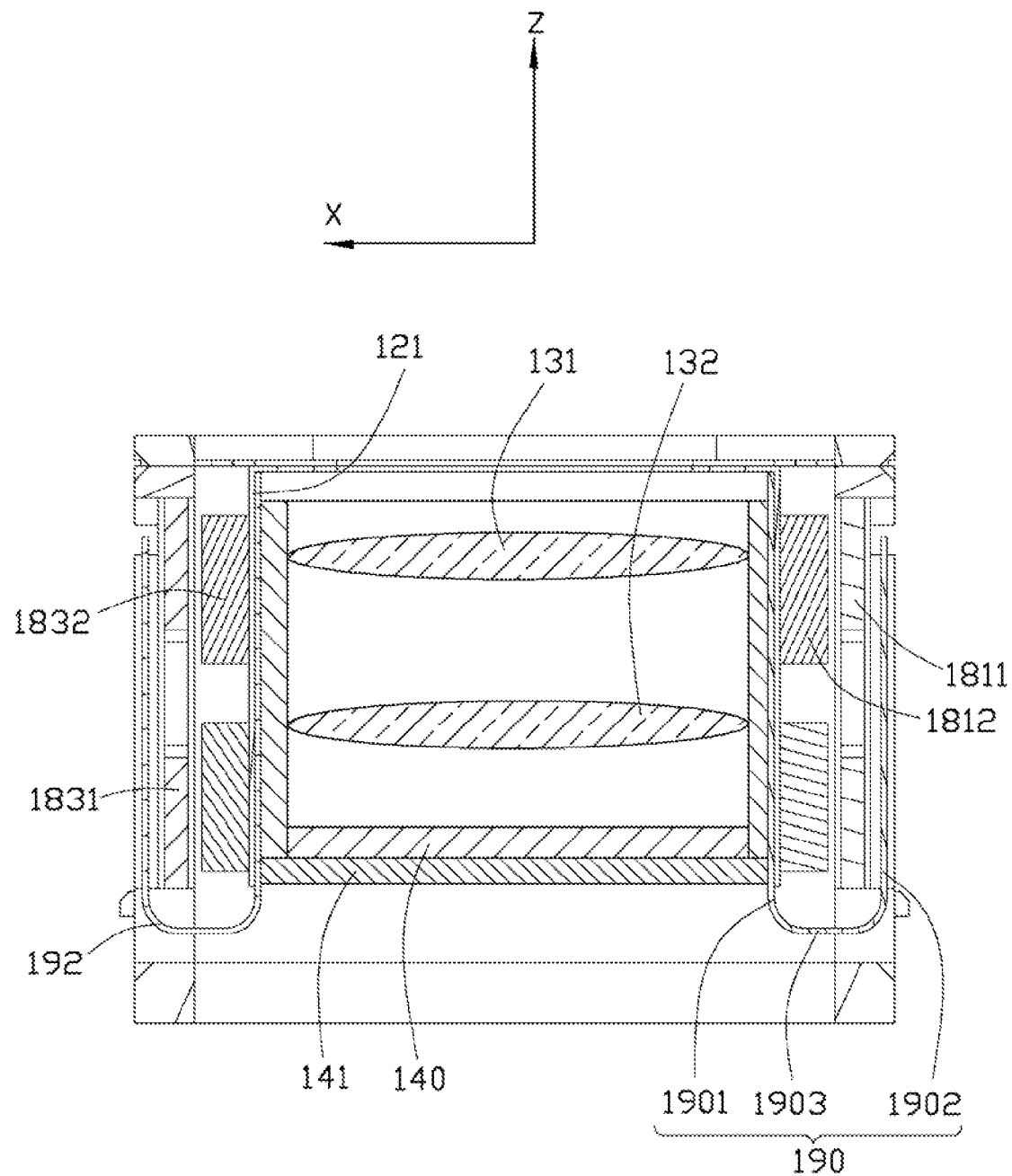
FIG. 4 is a cross-sectional view of the stabilization system of FIG. 1, taken along a line IV-IV thereof.
Figure 5:
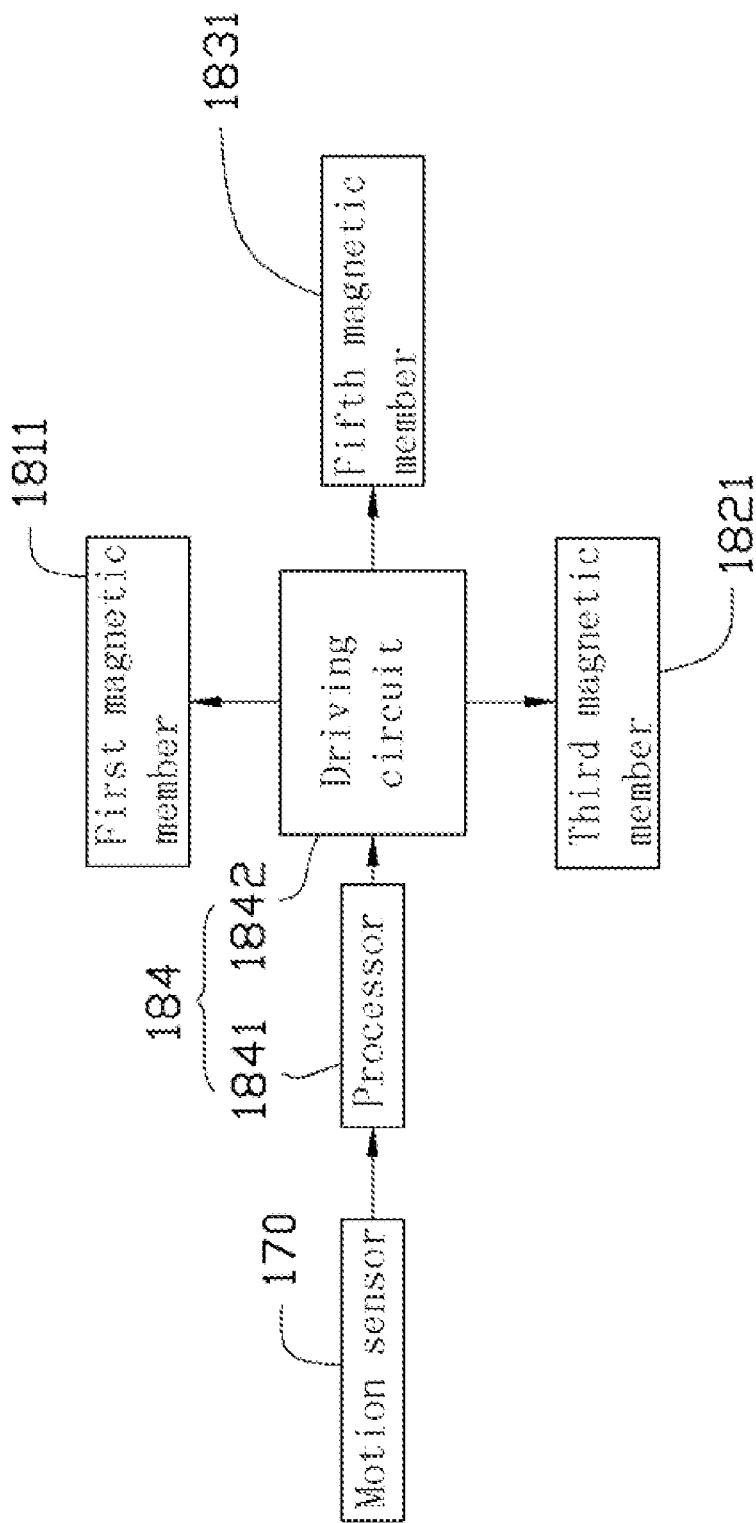
FIG. 5 is a block diagram showing a relationship between a motion sensor, a magnetic drive unit, a first magnetic member, a third magnetic member, and a fifth magnetic member of the stabilization system of FIG. 1.

Referring to FIGS. 1-5, an image stabilization system 100, in accordance with a first embodiment, is shown. The system 100 includes a fixed body 110, a movable unit 120, a lens unit 130, an image sensor 140, a pivot member 150, an elastic member 160, a motion sensor 170, a magnetic driving module 180, and three U-shaped magnetic shields 190, 191, 192 made of material having very high permeability.

The fixed body 110 is substantially cubic. The fixed body 110 is securely mounted on a main body of a camera (not shown) using the system 100. The fixed body 110 includes a main frame 111 and an attachable frame 112.

The main frame 111 is substantially cubic, and includes a first sidewall 1111, a second sidewall 1112, a third sidewall 1113 opposite to the first sidewall 1111, and a fourth sidewall 1114 opposite to the second sidewall 1112. The four sidewalls 1111, 1112, 1113, and 1114 cooperatively define a first receiving cavity 1115 for receiving the movable unit 120. The first sidewall 1111 defines a first receiving hole 1116 at the center thereof. The second sidewall 1112 defines a second receiving hole 1117 at the center thereof. The third sidewall 1113 defines a third receiving hole 1118 at the center thereof. An upper end surface of the fourth sidewall 1114 defines a first receiving recess 1119 for receiving the attachable frame 112. In other embodiments, the fixed body 110 may instead be any other suitable shape, such as cylindrical, pentagonal prismatic etc.

The attachable frame 112 is substantially L-shaped. The attachable frame 112 is configured for receiving the pivot member 150, and conveniently fixing the spring member 160 on the main frame 111. The attachable frame 112 includes a plate 1121, and a square frame 1122 perpendicular to the plate 1121. The plate 1121 is securely mounted in the recess 1119. The plate 1121 has an inner surface 1123 in the first receiving cavity 1115. The inner surface 1123 defines a first receiving portion 1124 for receiving the pivot member 150 therein. The square frame 1122 is securely mounted on the top surfaces of the first, second, and third sidewalls 1111, 1112, and 1113. In the present embodiment, the first receiving portion 1124 is a through hole. In alternative embodiments, the first receiving portion 1124 may be a recess. In other alternative embodiments, the pivot member 150 may instead be partially received in the fourth sidewall 1114. In such case, the recess 1119 and the plate 1121 may be omitted.

The movable unit 120 is substantially cubic, and received in the first receiving cavity 1115. The movable unit 120 is configured for receiving the lens unit 130 therein. The movable unit 120 includes a movable frame 121, and a receiving member 122 securely mounted on the movable frame 121.

The movable frame 121 is substantially cubic, and includes a first side plate 1211, a second side plate 1212, a third side plate 1213 opposite to the first side plate 1211, a fourth side plate 1214 opposite to the second side plate 1212, and a top plate 1215. The top plate 1215 is substantially square, and is perpendicular to the four plates 1211, 1212, 1213, and 1214. The four plates 1211, 1212, 1213, and 1214 cooperatively define a second receiving cavity 1216 for receiving the lens unit 130. The top plate 1215 defines a through hole 1217 at the center thereof. The through hole 1217 allows light to pass the top plate 1215. In other embodiments, the movable unit 120 may instead be any other suitable shape, such as cylindrical, pentagonal prismatic etc.

The receiving member 122 is configured for partially receiving the pivot member 150, thereby engaging with the attachable frame 112 for receiving the pivot member 150. The receiving member 122 is disposed between the plate 1121 and the fourth side plate 1214, and is spaced from the plate 1121. The receiving member 122 has an outer surface 1221 facing the inner surface 1123. The outer surface 1221 defines a second receiving portion 1222 for partially receiving the pivot member 150. In the present embodiment, the second receiving portion 1222 is a recess. In other embodiments, the second receiving portion 1222 may be a through hole. In a further embodiment, the receiving member 122 may be omitted. In such case, the pivot member 150 can be partially received in the fourth side plate 1214 therein.

The lens unit 130 is securely mounted on the movable frame 121. The lens unit 130 includes a lens 131 (see FIG. 3), a lens 132, and an actuator (not shown) for focusing and/or zooming.

The image sensor 140 is electrically connected to a printed circuit board 141 securely mounted on the bottom end of the lens unit 130, and is surrounded by the movable frame 121. The image sensor 140 is configured for converting an optical image to an electrical signal.

The pivot member 150 is engagingly received in and between the first receiving portion 1124 and the second receiving portion 1222, such that the movable frame 121, driven by the driving module 180, can rotate around the pivot member 150 relative to the main frame 111. In the present embodiment, the pivot member 150 is a ball, and the movable unit 130 can rotate around both the X axis and Y axis. In other embodiments, the pivot member 150 may instead be a shaft, such that the movable unit 130 can only rotate around the X axis, or only rotate around the Y axis.

The elastic member 160 is configured for providing an elastic restoring force to make the movable unit 120 coaxial to the fixed body 110. The elastic member 160 is disposed between the main and attachable frames 111, 112. The elastic member 160 includes a first fixed portion 161, a second fixed portion 162, and an elastic connecting portion 163 connecting the first fixed portion 161 to the second fixed portion 162. The first fixed portion 161 is, for example, adhesively mounted on the top surface of the top plate 1215. The second fixed portion 162 is securely mounted on the first sidewall 1111, the second sidewall 1112, and the third sidewall 1113, thereby interposing the elastic connecting portion 163 between the fixed body 110 and the movable unit 120. In alternative embodiments, the second fixed portion 162 may instead be secured on the square frame 1122. In other alternative embodiments, the elastic member 160 may instead be a spring. In such case, the number of the elastic member 160 may be two, three, and so on.

The motion sensor 170 is disposed on the bottom portion of the main frame 111, and is configured for sensing a movement of the system 100 (i.e., a movement of the main frame 111). The motion sensor 170 can be a gyro sensor.

The driving module 180 is configured for driving the lens unit 130 (i.e., the movable unit 120) to move relative to the main frame 111 to compensate for movements of the system 100 based on/associated with a motion detection result/signals of the motion sensor 170, thereby eliminating/reducing blur due to camera shake. The driving module 180 includes a first electromagnetic driving unit 181, a second electromagnetic driving unit 182, a third electromagnetic driving unit 183, and a control circuit 184.

The first electromagnetic driving unit 181 is configured for driving the lens unit 130 to rotate around Y axis relative to the main frame 111. The first electromagnetic driving unit 181 includes a first magnetic member 1811 received in the first receiving hole 1116, and a second magnetic member 1812 securely mounted on the first side plate 1211. The first magnetic member 1811 is opposite to the second magnetic member 1812. At least one of the first and the second magnetic members 1811, 1812 is electromagnetic so that a magnetic force generated between the first and the second magnetic members 1811, 1812 is controllable by the control circuit 184.

In the present embodiment, the first magnetic member 1811 is a coil (e.g., electromagnetic member), and includes an upper portion 1813 and a lower portion 1814. The second magnetic member 1812 includes an upper magnet 1815 spatially corresponding to the upper portion 1813, and a lower magnet 1816 spatially corresponding to the lower portion 1814. The S magnetic pole of the upper magnet 1815 faces away from the first side plate 1211, and the N magnetic pole of the upper magnet 1815 faces the first side plate 1211 or vice versa in other embodiments. The N magnetic pole of the lower magnet 1816 faces away from the first side plate 1211, and the S magnetic pole of the lower magnet 1816 faces the first side plate 1211 or vice versa in other embodiments.

The second electromagnetic driving unit 182 is configured for driving the lens unit 130 to rotate around the X axis relative to the main frame 111, and is similar to the first electromagnetic unit 181. The second electromagnetic driving unit 182 includes a third magnetic member 1821 received in the second receiving hole 1117, and a fourth magnetic member 1822 securely mounted on the second side plate 1212. The third magnetic member 1821 is opposite to the fourth magnetic member 1822. At least one of the third and fourth magnetic members 1821, 1822 is electromagnetic so that a magnetic force between the third and fourth magnetic members 1821, 1822 is controllable by the control circuit 184.

The third electromagnetic driving unit 183 is configured for driving the lens unit 130 to rotate around the Y axis relative to the main frame 111, and is similar to the first electromagnetic unit 181. The third electromagnetic driving unit 183 includes a fifth magnetic member 1831 received in the third receiving hole 1118, and a sixth magnetic member 1832 securely mounted on the third side plate 1213. The fifth magnetic member 1831 is opposite to the fifth magnetic member 1832. At least one of the fifth and sixth magnetic members 1831, 1832 is electromagnetic so that a magnetic force between the third and fourth magnetic members 1831, 1832 is controllable by the control circuit 184.

The control circuit 184 includes a processor 1841 and a driving circuit 1842 electrically connected to the processor 1841. The processor 1841 is electrically connected to the motion sensor 170. The driving circuit 1842 is electrically connected to the first magnetic member 1811, a third magnetic member 1821, and the fifth magnetic member 1931. The processor 1841 can be, for example, a digital signal processor (DSP) position controller.

The shield 190 is configured for enhancing magnetic field in the first electromagnetic driving unit 181, and preventing the magnetic field from interfering the normal operation of the image sensor 140. In the present embodiment, the shield 190 is made of ferronickel alloy. In alternative embodiments, the shield 190 may instead be made of any other magnetic permeability material, such as electrically conductive plastic, surface conductive material, electrically conductive glass, etc.

The shield 190 includes a first plate 1901, a second vertical 1902 opposite to the first plate 1901, and a connecting plate 1903 perpendicularly connected between the first plate 1901 and the second plate 1902. The first plate 1901 is securely mounted on the movable unit 120. The second plate 1902 is located on an opposite side of the first plate 1901 to the fixed body 110 such that the first electromagnetic driving unit 181 is arranged between the first plate 1901 and the second plate 1902. In the present embodiment, the first plate 1901 is securely mounted on the inner surface of the first side plate 1211, and the second plate 1902 is away from the outer surface of the first sidewall 1111. Thus, from the inside to the outside, the first plate 1901, the first side plate 1211, the second magnetic member 1812, the first magnetic member 1811, and the second plate 1902 are arranged in that order. In alternative embodiments, the first plate 1901 may instead be securely mounted on the outer surface of the side plate 1211. In such case, the second magnetic member 1812 is securely mounted on the inner surface of the first plate 1901, such that from the inside to the outside, the first side plate 1211, the first plate 1901, the second magnetic member 1812, the first magnetic member 1811, and the second vertical permeability plate 1902 are arranged in that order.

The shield 191 is similar to the shield 190, and is configured for enhancing magnetic field in the second electromagnetic driving unit 182, and preventing the magnetic field from interfering with the normal operation of the image sensor 140.

The shield 192 is similar to the shield 190, and is configured for enhancing magnetic field in the second electromagnetic driving unit 183, and preventing the magnetic field from interfering with the normal operation of the image sensor 140.

In operation, at the beginning of capturing an image with the system 100, the elastic members 160 are in a normal state; and there is no power supplied to the first magnetic member 1811, a third magnetic member 1821, and the third magnetic member 1831. At this moment, the system 100 forms an image associated with an object (not shown) on a first position of the image sensor 140.

During image capture, camera shake may cause, for example, the system 100 to rotate clockwise around the Y axis relative to the object. Accordingly, the image sensor 140 and the lens unit 130 are rotated with the system 100. The motion sensor 170 detects a movement of the system 100 and sends a motion detection result to the processor 1841. Based on the motion detection result, the processor 1841 computes a compensating adjustment for the lens unit 130 in order to reposition the image on the first position of the image sensor 140. For example, the computed compensating angle may require the lens unit 130 to rotate anti-clockwise around the Y axis a certain degree. The processor 1841 then sends a signal to the driving circuit 1842, and the driving circuit 1842 applies power to the first magnetic member 1811 in response to the signal, such that the second magnetic member 1812 (i.e. the movable frame 121), drove by magnetic force, rotates clockwise around the Y axis.

Hence, the movable unit 120 together with the lens unit 130 are rotated anti-clockwise the predetermined angle around the Y axis, and the elastic connecting portion 163 becomes stretched. As a result, the system 100 forms an image associated with the object (not shown) on the first position of the image sensor 140 and camera shake is compensated for. In addition, the drive module 180 of the system 100 applies magnetic forces to drive the movable unit 20 to rotate around the pivot member 150, and the control of the magnetic forces is easier. Therefore, the drive module 180 is simpler, and the system 100 is accordingly simpler, too. Therefore, the cost of the system 100 is lower.

After capturing the stabilized image of the object, even though the driving circuit 1842 may stop supplying power to the first magnetic member 1811, the elastic restoring forces generated by the deformation of the elastic connecting portion 163 can drive the movable unit 120 to be coaxial to the fixed body 110.

It is to be understood that when the system 10 shakes, the system 100 may be only rotated around the X axis. In such circumstances, the third magnetic member 1821 should and can be activated to adjust the position of the movable unit 120.

It is also to be understood that when the system 10 shakes, the system 100 may be rotated around both the X axis and the Y axis. In these circumstances, the first magnetic member 1811, a third magnetic member 1821, and the fifth magnetic member 1831 should be activated to adjust a position of the movable unit 120.

While certain embodiments have been described and exemplified above, various other embodiments will be apparent to those skilled in the art from the foregoing disclosure. The disclosure is not limited to the particular embodiments described and exemplified but is capable of considerable variation and modification without departure from the scope and spirit of the appended claims.

What is claimed is:

1. An image stabilization system comprising:
   a fixed body, the fixed body having a first receiving cavity therein and an inner surface in the first receiving cavity, the inner surface having a first receiving portion formed thereon;
   a movable unit received in the first receiving cavity, the movable unit having an outer surface facing the inner surface, the outer surface having a second receiving portion formed thereon;
   a pivot member located between the fixed body and the movable unit, the pivot member being engagingly received in and between the first receiving portion and the second receiving portion;
   a motion sensor disposed on the fixed body and configured for detecting a movement of the image stabilization system;
   a driving module configured for driving the movable unit to rotate around the pivot member to compensate a movement of the image stabilization system based on a motion detection result of the motion sensor; and
   a U-shaped magnetic shield, the U-shaped magnetic shield comprising a first plate, a second plate opposite to the first plate, and a connecting plate between the first plate and the second plate, the first plate being securely mounted on the movable unit, the second plate being located on an opposite side of the first place to the fixed body, the driving module arranged between the first plate and the second plate.

2. The image stabilization system of claim 1, wherein the pivot member comprises a ball, or a rotation shaft.

3. The image stabilization system of claim 1, wherein the driving module comprises an electromagnetic driving unit, and a control circuit, the electromagnetic driving unit comprises an electromagnetic member disposed on the fixed body, and a magnetic member mounted on the movable unit, the electromagnetic member is opposite to the magnetic member, the control circuit is configured for controlling a magnetic force generated between the electromagnetic member and the magnetic member.

4. The image stabilization system of claim 3, wherein the electromagnetic member comprises a coil, and comprises an upper portion, and a lower portion, the magnetic member comprises an upper magnet spatially corresponding to the upper portion, and a lower magnet spatially corresponding to the lower portion.

5. The image stabilization system of claim 4, wherein the S magnetic pole of the upper magnet faces the movable unit, the N magnetic pole of the upper magnet faces away from the movable unit, the N magnetic pole of the lower magnet faces the movable unit, and the S magnetic pole of the lower magnet faces away from the movable unit.

6. The image stabilization system of claim 3, wherein the control circuit comprises a processor and a driving circuit electrically connected to the processor, the processor is electrically connected to the motion sensor, and the driving circuit is electrically connected to the electromagnetic member.

7. The image stabilization system of claim 1, wherein the movable unit comprises a movable frame, and a receiving member mounted on the movable frame, the second receiving portion is defined in the receiving member.

8. The image stabilization system of claim 1, further comprising an elastic member for providing an elastic restoring force, the elastic member is interposed between the fixed body and the movable unit.

9. The image stabilization system of claim 1, wherein the U-shaped magnetic shield is comprised of a material selected from the group consisting of ferronickel alloy, electrically conductive plastic, surface conductive material and electrically conductive glass.

10. An image stabilization system for capturing an image of an object, the image stabilization system comprising:
   a fixed body, the fixed body having a first receiving cavity therein and an inner surface in the first receiving cavity, the inner surface having a first receiving portion formed thereon;
   a movable unit received in the first receiving cavity, the movable unit having an outer surface facing the inner surface, the outer surface having a second receiving portion formed thereon;
   an image sensor received in the fixed body;
   a pivot member located between the fixed body and the movable unit, the pivot member being engagingly received in and between the first receiving portion and the second receiving portion;
   a motion sensor disposed on the fixed body and configured for detecting a movement of the image stabilization system;
   a driving module configured for driving the movable unit rotate around the pivot member to relative to the fixed body, such that the image stabilization system forms an image of the object on an identical position of the image sensor before and after a shake of the image stabilization system; and
   a U-shaped magnetic shield, the U-shaped magnetic shield comprising a first plate, a second plate opposite to the first plate, and a connecting plate perpendicularly connected between the first plate and the second plate, the first plate being securely mounted on the movable unit, the second plate being located on an opposite side of the first plate to the fixed body, the driving module arranged between the first plate and the second plate.

11. The image stabilization system of claim 10, wherein the pivot member comprises a ball, or a rotation shaft.

12. The image stabilization system of claim 10, wherein the driving module comprises an electromagnetic driving unit, and a control circuit, the electromagnetic driving unit comprises an electromagnetic member disposed on the fixed body, and a magnetic member mounted on the movable unit, the electromagnetic member is opposite to the magnetic member, the control circuit is configured for controlling a magnetic force generated between the electromagnetic member and the magnetic member.

13. The image stabilization system of claim 12, wherein the electromagnetic member comprises a coil, and comprises an upper portion, and a lower portion, the magnetic member comprises an upper magnet spatially corresponding to the upper portion, and a lower magnet spatially corresponding to the lower portion.

14. The image stabilization system of claim 12, wherein the control circuit comprises a processor and a driving circuiting circuit electrically connected to the processor, the processor is electrically connected to the motion sensor, and the driving circuiting circuit is electrically connected to the electromagnetic member.

15. The image stabilization system of claim 10, wherein the movable unit comprises a movable frame, and a receiving member mounted on the movable frame, the second receiving portion is defined in the receiving member.

16. The image stabilization system of claim 10, further comprising an elastic member interposed between the fixed body and the movable unit.

17. The image stabilization system of claim 10, wherein the U-shaped magnetic shield is comprised of a material selected from the group consisting of ferronickel alloy, electrically conductive plastic, surface conductive material and electrically conductive glass.

18. An image stabilization system for capturing an image of an object, the image stabilization system comprising:
   a fixed body, the fixed body having a first receiving cavity therein and an inner surface in the first receiving cavity, the inner surface having a first receiving portion formed thereon;
   a movable unit received in the first receiving cavity, the movable unit having an outer surface facing the inner surface, the outer surface having a second receiving portion formed thereon;
   a focusing unit received in the movable unit;
   an image sensor received in the fixed body;
   a pivot member located between the fixed body and the movable unit, the pivot member being engagingly received in and between the first receiving portion and the second receiving portion;
   a motion sensor disposed on the fixed body and configured for detecting a movement of the image stabilization system;
   a driving module configured for driving the movable unit rotate around the pivot member to relative to the fixed body so as to counteract movement of the object relative to the focusing unit such that the image stabilization system can, after a shake of the image stabilization system, capture a stabilized image of the object which is substantially identical with an image thereof captured without the shake of the image stabilization system; and
   a U-shaped magnetic shield, the U-shaped magnetic shield comprising a first plate, a second plate opposite to the first plate, and a connecting plate between the first plate and the second plate, the first plate being securely mounted on the movable unit, the second plate being located on an opposite side of the first plate to the fixed body, the driving module arranged between the first plate and the second plate.

19. The image stabilization system of claim 18, wherein the pivot member comprises a ball, or a rotation shaft.

20. The image stabilization system of claim 18, wherein the driving module comprises an electromagnetic driving unit, and a control circuit, the electromagnetic driving unit comprises an electromagnetic member disposed on the fixed body, and a magnetic member mounted on the movable unit, the electromagnetic member is opposite to the magnetic member, the control circuit is configured for controlling a magnetic force generated between the electromagnetic member and the magnetic member.

* * * * *